March 2, 1971   W. B. Y. MILLER   3,567,413
METHOD FOR THE DISPOSAL OF MOLTEN SLAG
Filed April 7, 1969
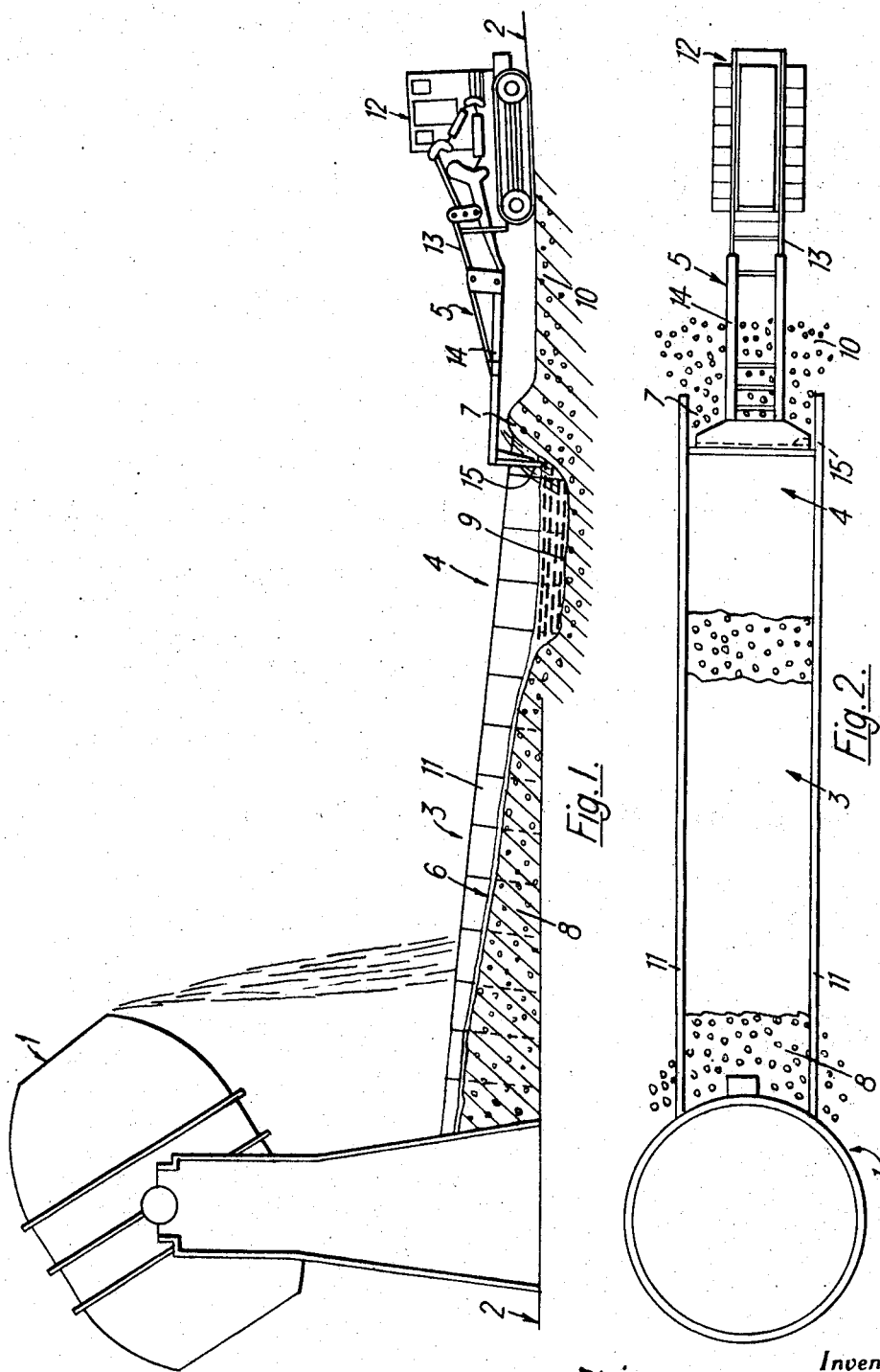

3,567,413
METHOD FOR THE DISPOSAL OF MOLTEN SLAG

William B. Y. Miller, Glasgow, Scotland, assignor to Colvilles Limited, Glasgow, Scotland
Continuation-in-part of application Ser. No. 555,591, June 6, 1966. This application Apr. 7, 1969, Ser. No. 822,817
Int. Cl. C03b 5/08
U.S. Cl. 65—19                                    1 Claim

ABSTRACT OF THE DISCLOSURE

In a process for forming hard slag lumps from molten slag, the molten slag is poured from an L–D type steelmaking vessel into a receiver having a destructible wall made of cool hard slag lumps comparable in size to the slag-lumps product desired, and a mobile boom-and-blade implement is then manipulated to treat the substantially uncooled pouring with the cool slag lumps of the wall, the treatment including adding the cool slag lumps of the wall to the molten slag pouring and agitating together in the atmosphere the added slag lumps and the molten slag to effect cooling and fragmentation of the molten slag and air-cooling of the molten fragments to slag lumps which are readily removable with the added slag lumps from the vicinity of the vessel.

---

This application is a continuation in part of application No. 555,591, filed June 6, 1966, now abandoned.

This invention relates to the disposal of molten slag produced in the manufacture of steel or the like.

The problem of efficient slag disposal has become acute in recent years with the widespread use in steelworks of the Linnz and Donnewitz (L–D) type process of steel manufacture. In said process, with the frequent slag and steel pourings from the steelmaking vessel, it is imperative to remove the slag quickly from the vicinity of the vessel, as otherwise the slag will accumulate and seriously delay the pourings.

A method of disposing of the molten slag produced by an open-hearth steel-making furnace is described in U.S. patent specification No. 3,109,727 (Miller) and comprises the steps of pouring the molten slag into a pit preformed in the floor of the steelwork, permitting the resulting slag pool to cool in the air for a short time so that a crust forms on the pool surface, applying water to the crust at intervals so as to cool the slag pool gradually throughout its depth without granulating the slag, permitting further cooling of the slag pool in the air so that the slag hardens and fragments to lump form, and clearing the slag lumps from the pit by means of a loader-type tractor. This combined air-and-water cooling is time-consuming, and consequently the method is unsuitable for use with molten slag from L–D type steelmaking vessels.

Also, in U.S. patent specification No. 3,171,736 (Debenham) it is proposed to pour the slag produced by an open-hearth steel-making furnace into an open-topped truncated-conical steel vessel on the steelwork floor, and to permit the static mass of molten slag to cool gradually to a hard mass in the vessel. The cooling may be assisted by adding material, e.g. debris from the charging floor of the furnace, to the molten slag as it flows into the vessel. The solidified slag is removed mechanically from the vessel through a side opening in the lower portion of the vessel. The air cools the static mass of slag in the vessel by heat conduction through the vessel walls which may be water-jacketed to enhance the cooling effect. This method also is time-consuming and is therefore unsuitable for use with L–D type steelmaking vessels.

The object of the present invention is to provide for the quick conversion to slag lumps of molten slag produced by an L–D type steelmaking vessel.

Material and apparatus for use in carrying out the steps of the invention will now be described by way of example with reference to the accompanying diagrammatic drawings in which FIG. 1 is a sectional side view of the material and apparatus, and FIG. 2 is a top plan view of FIG. 1.

Referring to the drawings:

In a steelworks an L–D type steelmaking vessel 1 has on the works floor 2 at the slagging side of the vessel and elongated delivery channel 3 into which the molten slag pours directly from the vessel, a receiver 4 at the lower end of the delivery channel and including a destructible wall 7 built on the works floor 2 and formed of cool slag lumps of a size comparable to that required for the product, and a tractor-mounted hoe-like implement 5 for use with the cool slag lumps in converting the molten slag pouring to slag lumps. The floor 6 of the channel 3 slopes downwards from the vessel 1 to the level of the works floor 2 so that the vessel discharges directly into the upper end of the channel and the molten slag flows downwards along the channel and away from the vessel. The bottom portion of the receiver 4 is disposed below the level of the works floor 2 and includes a hollow bed 9 of slag lumps, while the top portion of the receiver includes the destructible wall 7. The channel's sloped floor 6 is formed by the face of a sloped bank 8 of slag lumps on the works floor 2. The works floor 2 may also be of slag lumps, as indicated at 10. A pair of straight, parallel longitudinal walls 11 composed of series of upstanding slabs of cast iron constitute the side walls of both the channel 3 and the receiver 4, and the destructible wall 7 of the receiver extends transversely between the side walls of the receiver. As the volume of molten slag varies from one pouring to the other there may be overflow from the receiver, and it may therefore be convenient to extend the side walls 11 by building longitudinal banks of slag lumps and to provide one or more additional transverse walls of slag lumps, to confine any overflow. The tractor 12 on which the hoe-like implement 5 is mounted is of the endless-track excavator type having an hydraulic front linkage system 13 which usually carries a bucket, the hydraulic operation of the linkage system effecting lifting, lowering, and force-and-aft-tilting movements of the bucket to enable excavation of material and loading of material into a truck. The hoe-like implement 5 consists of an elongated, forwardly projecting, fabricated boom 14 detachably connected at its rear end to the top and bottom hydraulic links of the linkage system 13 in the same manner as the bucket which it replaces, and a transverse, downwardly projecting flat blade 15 fixed to the front end of the boom 14. The bladed boom is capable of fore-and-aft pushing and pulling movement, up-and-down movement, and fore-and-aft tilting movement.

A cooling bunker for the slag lumps product withdrawn longitudinally from the receiver 4 is located at one side of the receiver so that the withdrawn product can conveniently be moved laterally into the bunker by means of a loader tractor fitted with the usual bucket.

In use of the foregoing material and apparatus, if a large volume of molten slag is expected, the implement 5 is first operated in the manner of a hoe to dig in the floor of the receiver a hollow bed 9. The molten slag flows from the vessel 1 directly into the upper end of the channel 3 and thence flows down the channel away from the vessel 1 and into the receiver 4. When the flow from the vessel 1 is completed, the slag pouring forms a pool of molten slag in the receiver 4. While the entire pool is still in a substantially molten state, that is, without any substantial air precooling of the molten slag pouring, the blade of the implement 5 is used to treat the pouring with the comparatively cool slag lumps of the wall 7. The implement 5 is controlled by an operator located on the tractor which by virtue of the boom is remote from the pouring. The treatment includes the steps of pushing the cool lumps of the destructible wall into the molten-slag pouring to form a molten slag/slag lumps mixture in the atmosphere, and agitating the mixture whereby the molten slag of the mixture is cooled and fragments and the molten fragments cools in the atmosphere to form the slag lumps product. The treatment is performed successively with different portions of the gravel wall so that the wall is gradually demolished. The agitation includes lifting the mixture by means of the blade and then cascading the mixture through the atmosphere. The treatment is continued until the entire molten pouring becomes solid or semi-solid slag lumps. If additional relatively cold slag lumps are required for agitation purposes, they may be drawn from the cooling bunker or from the extended side walls by the implement and added to the molten pouring. By virtue of the channel length and the implement boom, the molten pouring can be treated without any air precooling and without danger from molten slag or molten metal slopping from the vessel. The operator is remote from the pouring so that there is no great discomfort to him through heat. It is found that the blade withstands the high temperatures quite well and has a reasonably long life; it is readily replaceable. Moreover, the destructible wall serves as a conveniently located source of cool lumps and its destruction facilitates access of the blade to the receiver and manipulation of the blade in the receiver.

During the agitation of the mixture in the atmosphere there is thorough aeration and fragmentation of the molten content, with the result that shortly the molten content cools to solidification in the form of hot lumps.

It is found that the molten pouring solidifies very quickly during agitation, the entire pouring being converted to lumps within about ten minutes of delivery to the receiver. To assist in the cooling of the hot lumps, they are spread by the blade as a layer, say on the works floor just beyond the receiver, for air cooling. The slag lump product together with the lumps from the wall are then transported laterally by the loader tractor into the bunker for final air cooling. The cooled slag lumps are mainly realtively hard, and the sizes vary from fines to large lumps. The slag lumps are easily loaded into trucks and transported to a dump. The lumps require no breaking-up before being passed to metal extraction or crushing plant. Thus, the receiver may be quickly and efficiently cleared of molten slag and put in readiness for the next slag pouring.

The destroyed wall 7 is easily restored, using the slag-lumps product. A thin, residual layer of slag on the sloped channel floor 6 cools rapidly in the air and fragments into lumps which is withdrawn by the blade.

The entire disposal and restoration operation is completed well within the normal time available between slag pourings, so that delay in pouring the slag and steel by reason of delay in slag disposal is avoided or minimized.

I claim:
1. A process for converting to slag lumps the molten slag produced by an L-D type steelmaking vessel and involving use of (a) a supply of cool slag lumps disposed on a floor adjacent to the vessel and comparable in size to the slag-lumps product desired and (b) an implement mounted on a tractive vehicle and composed of a boom projecting from the vehicle and a transverse blade fixed on and projecting downwards from the outer end of the boom, the implement being capable of up-and-down movement and fore-and-aft-tilting movement on the tractor, said process including the steps of using the cool slag lumps to build a destructible wall on a floor to form a receiver for molten slag, pouring molten slag from the vessel into the receiver, manipulating the blade to destroy the wall and add the cool slag lumps thereof to the molten pouring, and manipulating the blade to engage and agitate together in the atmosphere the added lumps and the molten pouring whereby the molten pouring is cooled and fragmented by the added lumps and the molten fragments are air-cooled to slag lumps.

References Cited
UNITED STATES PATENTS

| | | | |
|---|---|---|---|
| 127,699 | 6/1872 | Luckenbach | 65—19 |
| 3,109,727 | 3/1958 | Miller | 65—19 |
| 3,171,736 | 2/1961 | Debenham | 65—19 |

S. LEON BASHORE, Primary Examiner

R. L. LINDSAY, JR., Assistant Examiner

U.S. Cl. X.R.

65—20, 141